United States Patent [19]

Brossier et al.

[11] Patent Number: 5,347,807
[45] Date of Patent: Sep. 20, 1994

[54] COMBINED JET ENGINE WITH RAM JET AND TURBOJET

[75] Inventors: Pascal N. Brossier, Lieusaint; Georges Mazeaud, Yerres; Pascal C. Wurniesky, Savigny Le Temple, all of France

[73] Assignee: Societe Nationale D'Etude et de Construction de Moteurs d'Aviaton "SNECMA", Paris, France

[21] Appl. No.: 75,882

[22] Filed: Jun. 14, 1993

[30] Foreign Application Priority Data

Jun. 24, 1992 [FR] France ................. 92 07713

[51] Int. Cl.⁵ ............................................. F02K 7/16
[52] U.S. Cl. ........................................ 60/225; 60/244; 137/15.1
[58] Field of Search ............... 60/224, 225, 244, 245, 60/270.1; 137/15.1, 15.2

[56] References Cited

U.S. PATENT DOCUMENTS

| | | |
|---|---|---|
| 3,153,904 | 10/1964 | Ellis et al. |
| 3,938,328 | 2/1976 | Klees ................. 60/224 |
| 4,909,031 | 3/1990 | Grieb ................. 60/225 |
| 4,919,364 | 4/1990 | John et al. ......... 60/225 |
| 5,058,378 | 10/1991 | Enderle ............ 60/224 |
| 5,105,615 | 4/1992 | Herzog ............. 60/225 |
| 5,148,673 | 9/1992 | Enderle ............ 60/225 |

FOREIGN PATENT DOCUMENTS

| | | |
|---|---|---|
| 1121414 | 1/1962 | Fed. Rep. of Germany . |
| 1306025 | 9/1962 | France . |
| 871016 | 6/1961 | United Kingdom . |

*Primary Examiner*—Louis J. Casaregola
*Attorney, Agent, or Firm*—Oblon, Spivak, McClelland, Maier & Neustadt

[57] ABSTRACT

A jet engine includes a gas turbine, peripheral ramjet channels located outside the gas turbine and including burners wherein a gas circulation stream in the engine is subdivided over part of its length into a central turbojet stream which flows through the gas turbine, the peripheral ramjet channels and peripheral discharge channels terminating by flowing into a part of the gas circulation stream downstream of the turbine. A plurality of flaps are provided for opening and closing the central stream. A ring surrounds the central stream and extends in front of part of the peripheral discharge channels and ramjet channels. A motor is also provided for rotating the ring wherein the ring has a plurality of slots formed therein, the channels being arranged such that the slots successfully pass, during rotation of the ring in a continuous direction, in front of the discharge channels only, then in front of none of the channels and then in front of the ramjet channels only.

2 Claims, 2 Drawing Sheets

COMBINED JET ENGINE WITH RAM JET AND TURBOJET

BACKGROUND OF THE INVENTION

1. Field of the Invention

The invention relates to a combined jet engine having a ramjet and a turbojet and more specifically relates to a mechanism for conveniently passing between the two different operating modes.

2. Discussion of the Background

Turbojet propulsion is currently used in aircraft in supersonic flight up to roughly four times the speed of sound (Mach 4), but the ramjet is used for obtaining even higher speeds (Mach 7 or 8).

As the air is at a very high temperature during the use of the ramjet, it cannot pass through the turbine of the turbojet and must therefore skirt the stream where said turbine is located and passes through the ramjet channels.

Frequently discharge channels are added which skirt the turbine and the ramjet burners and which in part divert the air, which only mixes again with the remainder of the air at the jet engine discharge pipe in order to improve the flow lift and efficiency of the jet engine. These discharge channels, used exclusively in the turbojet mode, make the transition process from one operating mode to the other more difficult and the prior art flap systems, which open or close roughly simultaneously in order to bring about the desired operation are not entirely satisfactory and are frequently responsible for a thrust loss of the jet engine during switching processes.

SUMMARY OF THE INVENTION

The present invention relates to a jet engine comprising a gas circulation stream subdivided over part of its length into a central turbojet stream containing a gas turbine, peripheral ramjet channels containing the burners and peripheral discharge channels terminating by issuing onto a part of the central stream downstream of the turbine; flaps for opening and closing the central stream; and a ring surrounding the central stream and extending in front of a part of the peripheral discharge and ramjet channels, the ring being able to rotate under the action of a motor device and being provided with slots, the channels being positioned in such a way that during a rotation of the ring in a uniform direction, the slots successively come in front of only the discharge channels.

BRIEF DESCRIPTION OF THE DRAWINGS

A description will now be given of non-limitative embodiments of the invention with reference to the attached drawings, wherein.

DESCRIPTION OF THE PREFERRED EMBODIMENTS

Figure 1:
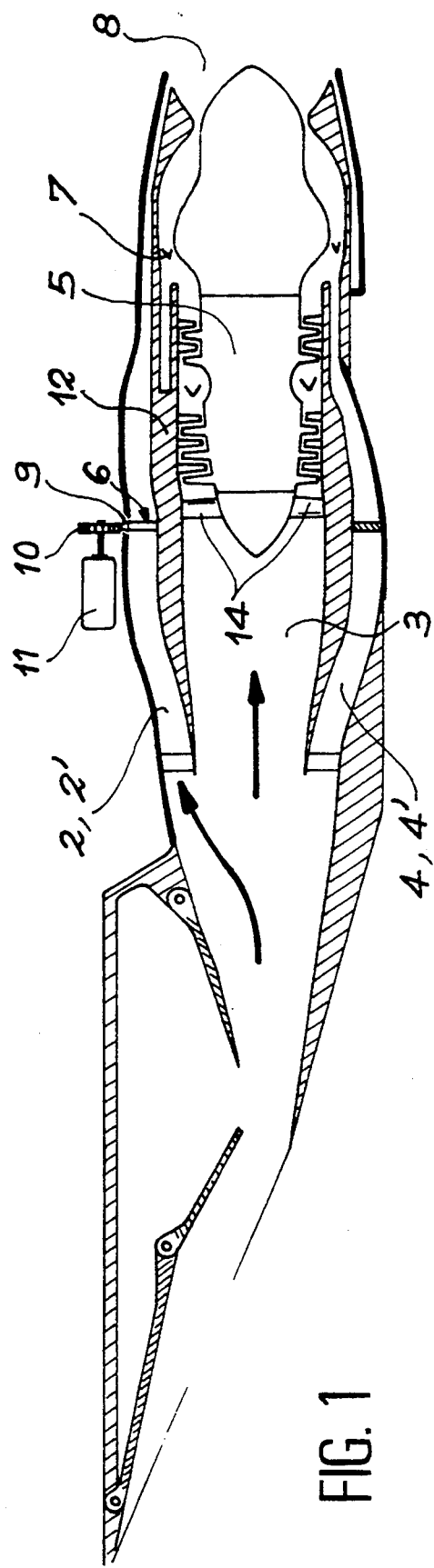
FIGS. 1 and 2 show the states of a combined jet engine respectively in the turbojet and ramjet modes.
Figure 2:
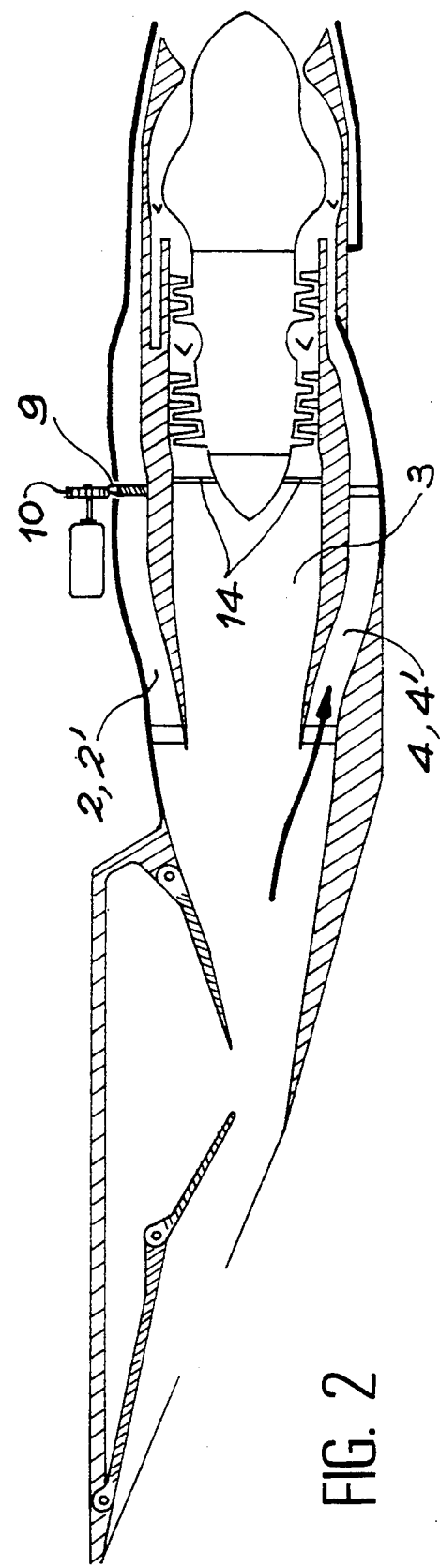

The jet engine comprises an air intake duct 1 upstream of the airflow and which defines a substantially circular stream. The latter is then subdivided into a central stream 3 traversed by the gases in the turbojet mode and which contains a gas turbine 5, as well as discharge channels 2, 2' and ramjet channels 4, 4' located around the central stream 3. There are four such channels. In front of a ring 6 constituting the main object of the invention, each of the channels has an angular extension with an approximately 40° circumference in each case and are grouped in pairs, a discharge channel 2 or 2' being adjacent to a respective ram jet channel 4 or 4'.

The ram jet channels 4, 4' issue into the central stream 3 downstream of the gas turbine 5, where the burners 7 are located. The discharge channels 2, 2' link the central stream 3 to the turbojet discharge pipe 8.

The ring 6 incorporates an external toothed rim 9 on which meshes a pinion 10 moved by a motor 11. In this embodiment it essentially extends to a position midlength of the ramjet channels 4, 4' and to a third of the length of the discharge channels 2, 2'. It rolls on the cylindrical partition 12 separating the central stream 3 from the channels by means of rollers. The section of each channel is surrounded by a circular gasket, which rubs on the ring 6 and prevents air leaks between the channels. These means are conventional in the art and are not shown here.

Figure 3:
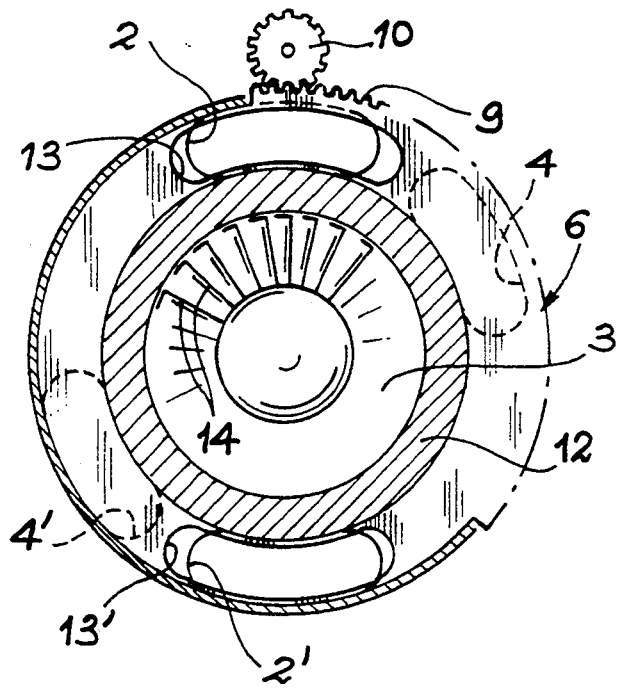
FIGS. 3 to 5 show cross-sections of a jet engine illustrating the transition stages by essentially showing the displacements of the ring.

The ring 6 is provided with two diametrically opposite slots 13, 13' extending over virtually the entire width of the ring 6 and over roughly a quarter circumferential turn of each of them. Other arrangements could be easily found if the channels were differently positioned, e.g. at different circumferential positions or having different diameters. In FIG. 3, which corresponds to the state of FIG. 1, i.e. a turbojet operating mode, the air flows freely through the central stream 3 and through the discharge channels 2, 2', in front of which extends part of the slots 13, 13'. However, the channels 4, 4' are obstructed by the solid parts of the ring 6.

Figure 4:
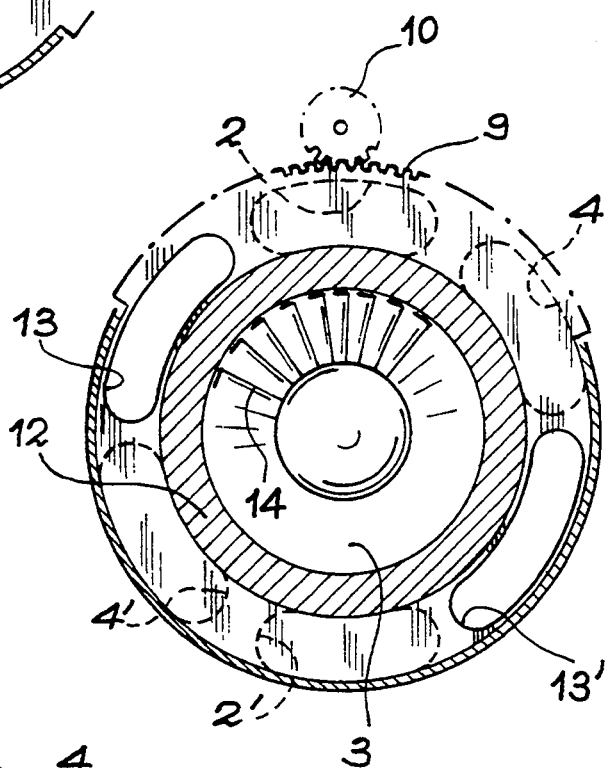
Figure 5:
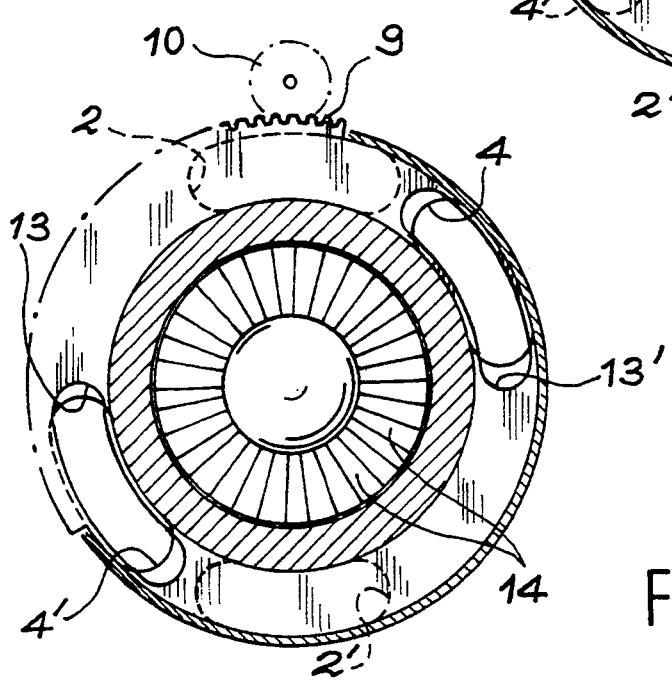

The switching operation consists of a continuous rotation of the ring 6 in a uniform direction and firstly involves a closing transition of the discharge channels 2, 2' by the solid parts of the ring 6 (FIG. 4) and then an opening of the ram jet channels 4, 4' in front of which come respectively part of the slots 13', 13 (FIG. 5). When the ramjet channels 4, 4' are open, the central stream 3 is rapidly obstructed as a result of the rotation of the radial flaps 14 located at the intake of the turbine 5 and which rotate on pivots, not shown, in order to form a continuous wall. Such flaps 14 and their control system are identical to those of variable setting stator blades (pivoting) used on numerous compressor stators for optimizing their efficiency under all running conditions. Control can take place by a switch which is contacted by the ring 6 as soon as the channels 4, 4' are open or by any other servocontrol means. Thus, the two operating modes co-exist, but for too short a time to damage the turbojet parts. The preliminary closure of the discharge channels 2, 2' makes it possible to immediately supply the ram jet channels 4, 4' with an appropriate flow rate and pressure and prevent any thrust loss on passing between the two modes and without the pressure increase to which the turbojet is momentarily exposed being able to damage it.

Obviously, numerous modifications and variations of the present invention are possible in light of the above teachings. It is therefore to be understood that, within the scope of the appended claims, the invention may be practiced otherwise than as specifically described herein.

We claim:

1. A jet engine, which comprises:

a gas turbine located in the engine;

peripheral ramjet channels located in the engine and outside said gas turbine and including burners wherein peripheral discharge channels are located in the engine and a gas circulation stream flow through the engine which is subdivided over part of the length of the stream into a central turbojet stream which flows through said gas turbine, and wherein said peripheral ramjet channels and said peripheral discharge channels terminate by issuing into a part of the gas circulation stream downstream of the turbine;

a plurality of flaps located in the engine for opening and closing the central stream;

a ring surrounding the central stream and extending in front of part of the peripheral discharge channels and the ramjet channels, and a motor for rotating the ring wherein the ring has a plurality of slots formed therein, the peripheral discharge channels and ramjet channels being arranged such that the slots of the ring successively pass, during rotation of the ring in a continuous direction, in front of the discharge channels only, then in front of none of the channels and then in front of the ramjet channels only.

2. A jet engine according to claim 1, which comprises a pinion which is driven by said motor wherein the ring includes a toothed rim which meshes with said pinion.

* * * * *